No. 863,769. PATENTED AUG. 20, 1907.
J. K. WILLIAMS.
CIGAR MOISTENER.
APPLICATION FILED MAR. 24, 1906.
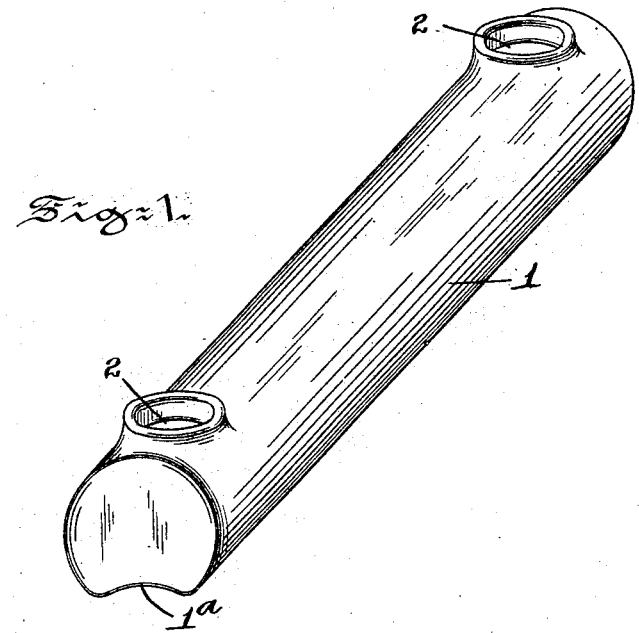
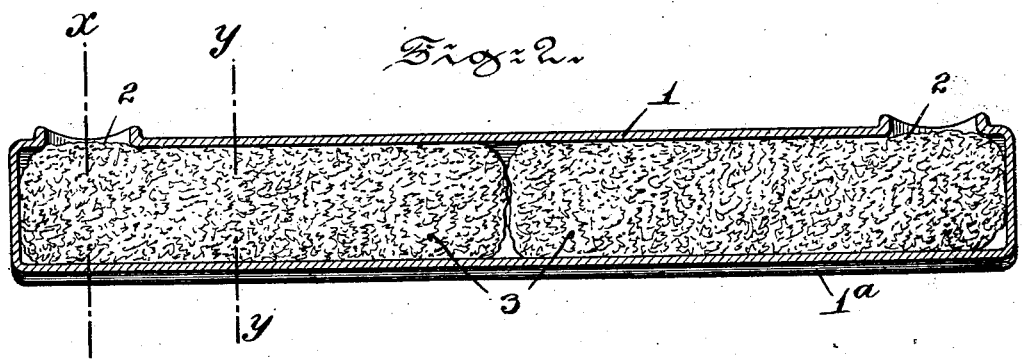
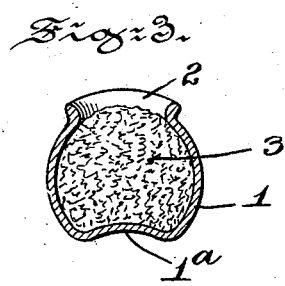 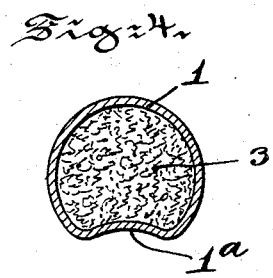
Witnesses
Jas. C. Wohrmuth
S. G. Doyle
Inventor
John K. Williams
By Walter C. Pusey
Attorney

UNITED STATES PATENT OFFICE.

JOHN K. WILLIAMS, OF PHILADELPHIA, PENNSYLVANIA.

CIGAR-MOISTENER.

No. 863,769.     Specification of Letters Patent.     Patented Aug. 20, 1907.

Application filed March 24, 1906. Serial No. 307,770.

*To all whom it may concern:*

Be it known that I, JOHN K. WILLIAMS, a citizen of the United States, residing at the city and county of Philadelphia, in the State of Pennsylvania, have invented certain new and useful Improvements in Cigar-Moisteners, of which the following is a full, clear, and exact description, reference being had to the accompanying drawings, of which—

Figure 1 is an enlarged perspective of my device. Fig. 2 is a medial vertical section. Fig. 3 is a section on line $x$—$x$, Fig 2. Fig. 4 is a section on line $y$—$y$, Fig. 2.

The object of this invention is to provide a device that may be placed in a box of cigars, and which will communicate moisture thereto, whereby the cigars are prevented from becoming too dry and brittle.

To this end, the invention consists of a tube or molded form of glass or other suitable material, closed at the ends, and provided in its upper wall with an opening or openings, together with a suitable packing of absorbent material, such as sponge, within and substantially filling the said tube or molded form, whereby, when said absorbent material is charged with water, and the device is placed in a box of cigars, the moisture will, as evaporation occurs, be yielded up by the absorbent, and passing out of the tube through the opening or openings, will moisten the cigars.

The invention further consists of certain details hereinafter pointed out.

In the drawings, 1 is a tube or molded form of glass or the like, and of approximately the size and shape of a cigar. This tube is closed at the ends, and its lower side, 1$^a$ is flattened or slightly concave as seen in Figs. 1, 3 and 4, for a purpose hereinafter appearing. Through the upper wall of the tube is an opening, 2, adjacent one end of the tube. In this instance I have shown two of said openings, 2, one adjacent each end of the tube, for a purpose hereinafter appearing. Within the tube, and substantially filling the same, so as to underlie the openings, 2, is a body, 3, of absorbent material such as sponge.

The manner of use of the device is as follows:—The sponge, 3, having been inserted in the tube, 1, the same is charged with water, which swells it up to fill the tube, and the device is ready for use. The tube, which is approximately the size and shape of a cigar, is placed in a box of cigars; one of the cigars being removed to permit this. The openings, 2, are uppermost, and the flattened or concave lower side of the tube resting upon the second layer or row of cigars in the box prevents the tube from being turned over, and so the water from flowing out of the openings on to the cigars below. As evaporation of the water in the sponge, 3, occurs, the same passes through the openings, 2, and circulates through the box, maintaining the cigars therein in a properly moist condition.

The advantage of having two or more openings, 2, is that it permits a better circulation of air in the tube, thus promoting evaporation, and consequently increasing the moisture of the air surrounding the cigars in the box.

Having thus described my invention, I claim as new and desire to secure by Letters Patent:—

1. A cigar moistener, comprising a tubular body flattened at one of its sides and having an opening formed in the side directly opposite to the flattened side, the latter preventing the moistener turning when in applied position, and thereby maintaining said opening uppermost, and a body of absorbent material filling said tubular body, substantially as set forth.

2. A cigar moistener, comprising a tubular body closed at the ends, and flattened on the under side, said tubular body being approximately the size and shape of a cigar, and provided with an opening in the upper wall thereof adjacent each end, together with a body of absorbent material filling said tubular body, and extending beneath said openings, substantially as set forth.

In testimony whereof, I have hereunto affixed my signature.

JOHN K. WILLIAMS.

Witnesses:
WALTER C. PUSEY,
WM. H. SMITH.